US008898751B2

(12) United States Patent
Yin et al.

(10) Patent No.: US 8,898,751 B2
(45) Date of Patent: Nov. 25, 2014

(54) SYSTEMS AND METHODS FOR AUTHORIZING THIRD-PARTY AUTHENTICATION TO A SERVICE

(75) Inventors: Fenglin Yin, Lexington, MA (US); Jack Jianxiu Hao, Lexington, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 435 days.

(21) Appl. No.: 13/279,865

(22) Filed: Oct. 24, 2011

(65) Prior Publication Data

US 2013/0104202 A1    Apr. 25, 2013

(51) Int. Cl.
*G06F 7/04*  (2006.01)
*G06F 21/42*  (2013.01)

(52) U.S. Cl.
CPC ................................ *G06F 21/42* (2013.01)
USPC ................. 726/5; 726/19; 709/203; 455/410; 707/758

(58) Field of Classification Search
USPC .......... 726/5, 19; 709/203; 455/410; 707/758
See application file for complete search history.

(56) References Cited

U.S. PATENT DOCUMENTS

| 8,126,904 | B1* | 2/2012 | Bettinger et al. ............. 707/758 |
| 2010/0049790 | A1* | 2/2010 | Schreiber ...................... 709/203 |
| 2011/0088090 | A1* | 4/2011 | O'Brien et al. ................ 726/19 |
| 2011/0287739 | A1* | 11/2011 | Cajigas Bringas et al. ... 455/410 |

OTHER PUBLICATIONS

Google (Federated Login for Google Account Users, 2010, retrieved from http://rbonini.wordpress.com/2010/08/30/windows-azure-feedreader-choosing-a-login-system-which-would-you-choose/).*

* cited by examiner

*Primary Examiner* — Brian F Shaw

(57) ABSTRACT

Systems and method for authorizing third-party authentication to a service are disclosed herein. As exemplary method includes an online service provider subsystem, which is configured to provide a service, 1) receiving a request from a user to use a third-party authentication service to authenticate the user to the service, 2) directing, in response to the request, the user to authenticate to the third-party authentication service, 3) receiving, from a third-party subsystem that provides the third-party authentication service, a third-party user identifier for the user, 4) requiring the user to verify an identity of the user, and 5) authorizing, based on the verified identity of the user, use of the third-party user identifier to authenticate the user to the service. Corresponding methods and systems are also disclosed.

18 Claims, 14 Drawing Sheets

OpenID Authorization for DVR Manager

In order to authorize OpenID sign-in to the DVR Manager, please sign in to the DVR Manager to verify your identity.

User ID

Password

Sign In

Fig. 7

SYSTEMS AND METHODS FOR AUTHORIZING THIRD-PARTY AUTHENTICATION TO A SERVICE

BACKGROUND INFORMATION

Certain online service providers require authentication of a user before granting the user access to a service provided by the service provider. A common practice is to require the user to provide login information such as a username and password that the service provider may use to authenticate the identity of the user.

It is common for a user of multiple services provided by one or more online service providers to create and manage multiple different usernames and passwords. This can become inconvenient, confusing, and/or burdensome to the user.

Attempts have been made to reduce the number of usernames and passwords that have to be created, maintained, and/or used by a user of multiple services. For example, single-sign-on technologies have been created to allow a single set of user credentials (e.g., a username and/or password) to be used for federated login to a set of services and/or service providers.

For example, a standard known as "OpenID" has been developed to allow third-party authentication to be used by service providers to authenticate users to services provided by service providers. In accordance with the OpenID standard, an OpenID provider generates and maintains a unique identifier for a user. The unique identifier is referred to as the user's OpenID. A service provider may establish a relationship with the OpenID provider and authorize the use of the user's OpenID to authenticate the user to a service provided by the service provider. Thereafter, the user may log in to the service by simply indicating a desire to use the user's OpenID for login and then authenticating (e.g., logging in) to the OpenID provider. Once the OpenID provider authenticates the user, the OpenID provider provides the user's OpenID to the service provider, which may then use the user's OpenID to authenticate the user to the service provided by the service provider.

However, there are concerns about potential security vulnerabilities of the OpenID standard. Consequently, certain service providers may be reluctant to authorize the use of users' third-party OpenIDs to authenticate the users to services provided by the service providers. Such service providers may be more willing to consider authorizing the use of users' third-party OpenIDs for authentication to services if additional security measures were to be implemented in conjunction with authorization of users' third-party OpenIDs. For at least these reasons, there exists a need and/or desire for new and/or improved technologies for authorizing third-party authentication of users to a service.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

FIGS. 7-8 illustrate additional exemplary graphical user interfaces according to principles described herein.

DETAILED DESCRIPTION OF PREFERRED EMBODIMENTS

Systems and method for authorizing third-party authentication to a service are disclosed herein. The exemplary systems and methods described herein implement one or more security measures in conjunction with authorization of third-party authentication to a service.

In certain embodiments, for example, an online service provider subsystem, which is configured to provide a service, 1) receives a request from a user to use a third-party authentication service to authenticate the user to the service, 2) directs, in response to the request, the user to authenticate to the third-party authentication service, 3) receives, from a third-party subsystem that provides the third-party authentication service, a third-party user identifier for the user, 4) requires the user to verify an identity of the user, and 5) authorizes, based on the verified identity of the user, use of the third-party user identifier to authenticate the user to the service. Examples of the service provider subsystem requiring the user to verify an identity of the user and authorizing, based on the verified identity of the user, use of the third-party user identifier to authenticate the user to the service are described herein.

By implementing one or more security measures in conjunction with authorization of third-party authentication to a service, such as by requiring a user to verify an identity of a user such as described herein, the systems and methods described herein may enhance the security associated with third-party authentication to a service. Consequently, service providers may be more willing to consider allowing third-party authentication to services provided by the service providers. This may be beneficial to users of multiple services who wish to use a single set of credentials to log in to the services. In addition, service providers who allow third-party authentication to services may benefit from increased satisfaction among users of the services and/or from enhance security in allowing third-party authentication to the services.

Exemplary systems and method for authorizing third-party authentication to a service will now be described with reference to the drawings.

Figure 1:
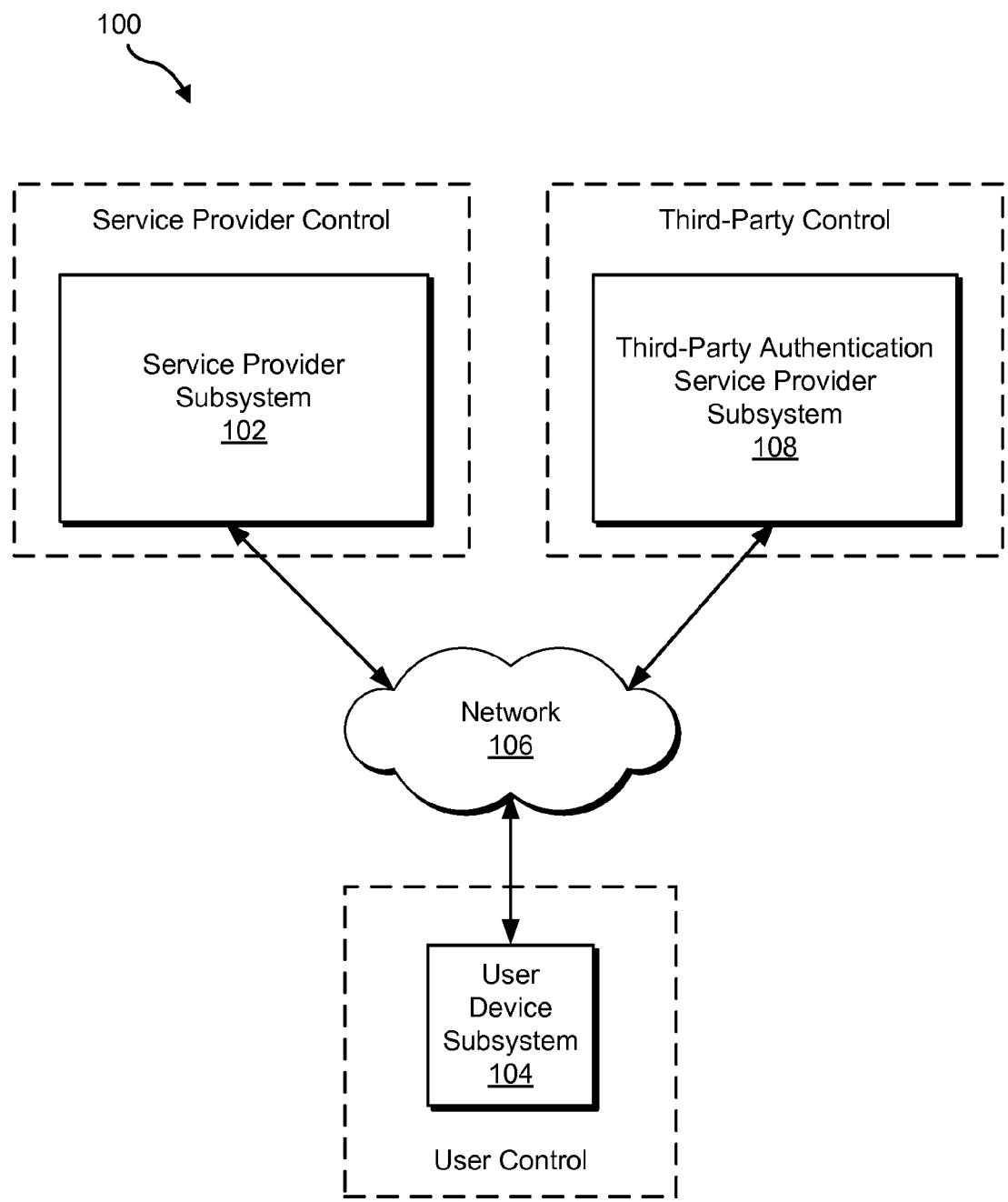
FIG. 1 illustrates an exemplary service access system according to principles described herein.

FIG. 1 illustrates an exemplary service access system 100 (or simply "system 100") that includes a service provider subsystem 102 configured to provide one or more services for access by a user utilizing a user device subsystem 104. Service provider subsystem 102 may include or be implemented by one or more computing devices of a server-side computing system controlled by (e.g., operated by) a service provider. User device subsystem 104 may include or be implemented by one or more client-side computing devices controlled by (e.g., operated by) a user (e.g., an end user of one or more services provided by service provider subsystem 102). Examples of such user devices include, without limitation, a personal computer, a mobile phone device, a tablet computer, and any other computing device or combination of computing devices configured to access a service provided by service provider subsystem 102.

Service provider subsystem 102 and user device subsystem 104 may communicate using any remote communications technologies suitable to support delivery of and access to a service provided by service provider subsystem 102. Examples of such communication technologies include, without limitation, Global System for Mobile Communications ("GSM") technologies, Long Term Evolution ("LTE") technologies, Code Division Multiple Access ("CDMA") technologies, Time Division Multiple Access ("TDMA") technologies, Evolution Data Optimized Protocol ("EVDO") (e.g., "1×EVDO"), radio frequency ("RF") signaling technologies, radio transmission technologies (e.g., One Times Radio Transmission Technology ("1×RTT")), Transmission Control Protocol ("TCP"), Internet Protocol ("IP"), Session Initiation Protocol ("SIP"), Real-Time Transport Protocol ("RTP"), User Datagram Protocol ("UDP"), Hypertext Transfer Protocol ("HTTP"), Hypertext Transfer Protocol Secure ("HTTPS"), Ethernet, wireless communications technologies, other suitable communications technologies, and any combination or sub-combination thereof.

Service provider subsystem 102 may provide and user device subsystem 104 may access one or more services by way of a network 106. Network 106 may include any network provided by one or more appropriately configured network devices (and communication links thereto) and over which communications and data may be transported between service provider subsystem 102 and user device subsystem 104. For example, network 106 may include, but is not limited to, a mobile phone network (e.g., a cellular phone network, a 3G network, a 4G network, etc.), a satellite media network (e.g., a broadcasting network, a terrestrial media broadcasting network), a media content distribution network (e.g., a subscriber television network), a telecommunications network, the Internet, the World Wide Web, a wide area network, a local area network, any other network capable of transporting communications and data between service provider subsystem 102 and user device subsystem 104, and/or any combination or sub-combination thereof.

Service provider subsystem 102 may provide any service that may be accessed, by way of network 106, by a user using user device subsystem 104. The service may be provided for free, or may require payment of a fee (e.g., a subscription fee) in order to be accessed by the user. In certain embodiments, service provider subsystem 102 may be configured to provide a service related to distribution of and/or access to media content. For example, service provider subsystem 102 may provide a media content delivery service (e.g., a broadcast, multicast, or narrowcast television content delivery service, a live television streaming service, a video-on-demand service, etc.), an online gaming service, a cloud-based content management service, a remote digital video recorder ("DVR") service, and/or any other service that may be accessed remotely, by way of network 106, by a user utilizing user device subsystem 104. In certain exemplary implementations, service provider subsystem 102 may provide a remote DVR manager service that may be accessed and used by a user to control operation of a DVR (e.g., a network DVR and/or an end-user DVR located at a customer premises) application, service, and or device.

Service provider subsystem 102 and/or one or more services provided by service provider subsystem 102 may be "online," which may refer to service provider subsystem 102 being connected to network 106 and/or to the services provided by service provider subsystem 102 being provided over network 106 for remote access by user device subsystem 104 by way of network 106.

Service provider subsystem 102 may be configured to require authentication of a user to service provider subsystem 102 and/or to a service provided by service provider subsystem 102 before granting the user access to the service. The phrases "authenticating a user to a service provided by service provider subsystem 102" and "authenticating a user to service provider subsystem 102" will be used interchangeably herein.

In certain embodiments, service provider subsystem 102 may be configured to generate, maintain, and use data representative of user credentials to authenticate a user. For example, when a user initially registers with service provider subsystem 102, service provider subsystem 102 may require that the user provide user credentials, such as a user identifier (e.g., a username) and password that will be used by service provider subsystem 102 going forward to authenticate the user. These user credentials may be specific to the user, service provider subsystem 102, and/or a particular service provided by service provider subsystem 102. After registration of the user with service provider subsystem 102, the user may provide the same user credentials (e.g., by logging in) for authentication to service provider subsystem 102 to gain access to a service provided by service provider subsystem 102.

While user credentials specific to service provider subsystem 102 and/or a service provided by service provider subsystem 102 may be used to authenticate a user to a service provided by service provider subsystem 102, certain users may want to use other credentials not specific to service provider subsystem 102 or a service provided by service provider subsystem 102 for authentication to the service. System 100 may provide this capability as described herein.

As shown in FIG. 1, system 100 further includes a third-party authentication service provider subsystem 108 (or simply "third-party subsystem 108") configured to communicate with service provider subsystem 102 and user device subsystem 104 by way of network 106. Third-party subsystem 108 may communicate with service provider subsystem 102 and user device subsystem 104 using any suitable communication technologies, including any of those disclosed herein. Third-party subsystem 108 may include or be implemented by one or more computing devices of a server-side computing system controlled by (e.g., operated by) a third party (e.g., a party other than the service provider controlling service provider subsystem 102 and the user controlling user device subsystem 104). The third-party may include an authentication service provider that operates independently of the service provider controlling service provider subsystem 102. The computing system of service provider subsystem 102 and the computing system of third-party authentication service provider subsystem 108 may be separate and/or operate independently of one another.

Third-party subsystem 108 may provide a third-party authentication service for access and use by service provider subsystem 102. To this end, the service provider operating service provider subsystem 102 and the third party operating third-party subsystem 108 may establish a relationship (e.g., a trusted business relationship) and configure service provider subsystem 102 and third-party subsystem 108 to communicate with one another and/or with user device subsystem 104 in a way that provides service provider subsystem 102 access to the third-party authentication service provided by third-party subsystem 108.

Third-party subsystem 108 may be configured to require authentication of a user to third-party subsystem 108 and/or the third-party authentication service provided by third-party subsystem 108 before granting the user access to the third-party authentication service. The phrases "authenticating a user to a third-party authentication service" and "authenticating a user to third-party subsystem 108" will be used interchangeably herein. In certain embodiments, third-party subsystem 108 may be configured to generate, maintain, and use data representative of user credentials to authenticate a user. For example, when a user initially registers with third-party subsystem 108, third-party subsystem 108 may require the user to provide user credentials, such as a username and password that will be used by third-party subsystem 108 going forward to authenticate the user. These user credentials may be specific to the user, third-party subsystem 108, and/or the third-party authentication service provided by third-party subsystem 108.

In conjunction with the initial registration of the user with third-party subsystem 108, third-party subsystem 108 may generate and maintain data representative of a unique user identifier associated with the user. The user identifier may be in any form that allows a unique user identifier to be created for each user and that may be used to identify the user.

After registration of the user with third-party subsystem 108, the user may provide the same user credentials (e.g., by logging in) specific to the third-party subsystem 108 for authentication to third-party subsystem 108 to gain access to the third-party authentication service provided by third-party subsystem 108. When a user is authenticated to third-party subsystem 108, third-party subsystem 108 may be configured to share the unique user identifier associated with the user with a party that has established a trusted business relationship with the third party. For example, third-party subsystem 108 may send data representative of the unique user identifier associated with the user to service provider subsystem 102 for use by service provider subsystem 102 to authenticate the user to a service provided by service provider subsystem 102.

In certain embodiments, the third party operating third-party subsystem 108 may be an OpenID provider, and third-party subsystem 108 may be configured to provide a third-party authentication service in accordance with a defined OpenID standard and/or protocol. In such embodiments, third-party subsystem 108 may generate and maintain data representative of a unique user identifier in the form of an OpenID associated with a user. Third-party subsystem 108 may be configured to provide the OpenID associated with the user to service provider subsystem 102 for use by service provider subsystem 102 to authenticate the user to a service provided by service provider subsystem 102.

Before service provider subsystem 102 uses a third-party user identifier provided by third-party subsystem 108 to authenticate a user to a service provided by service provider subsystem 102, service provider subsystem 102 first authorizes use of the third-party identifier to authenticate the user to the service provided by service provider subsystem 102. As described herein, service provider subsystem 102 may be configured to selectively authorize a third-party identifier in a way that implements one or more security measures.

Figure 2:
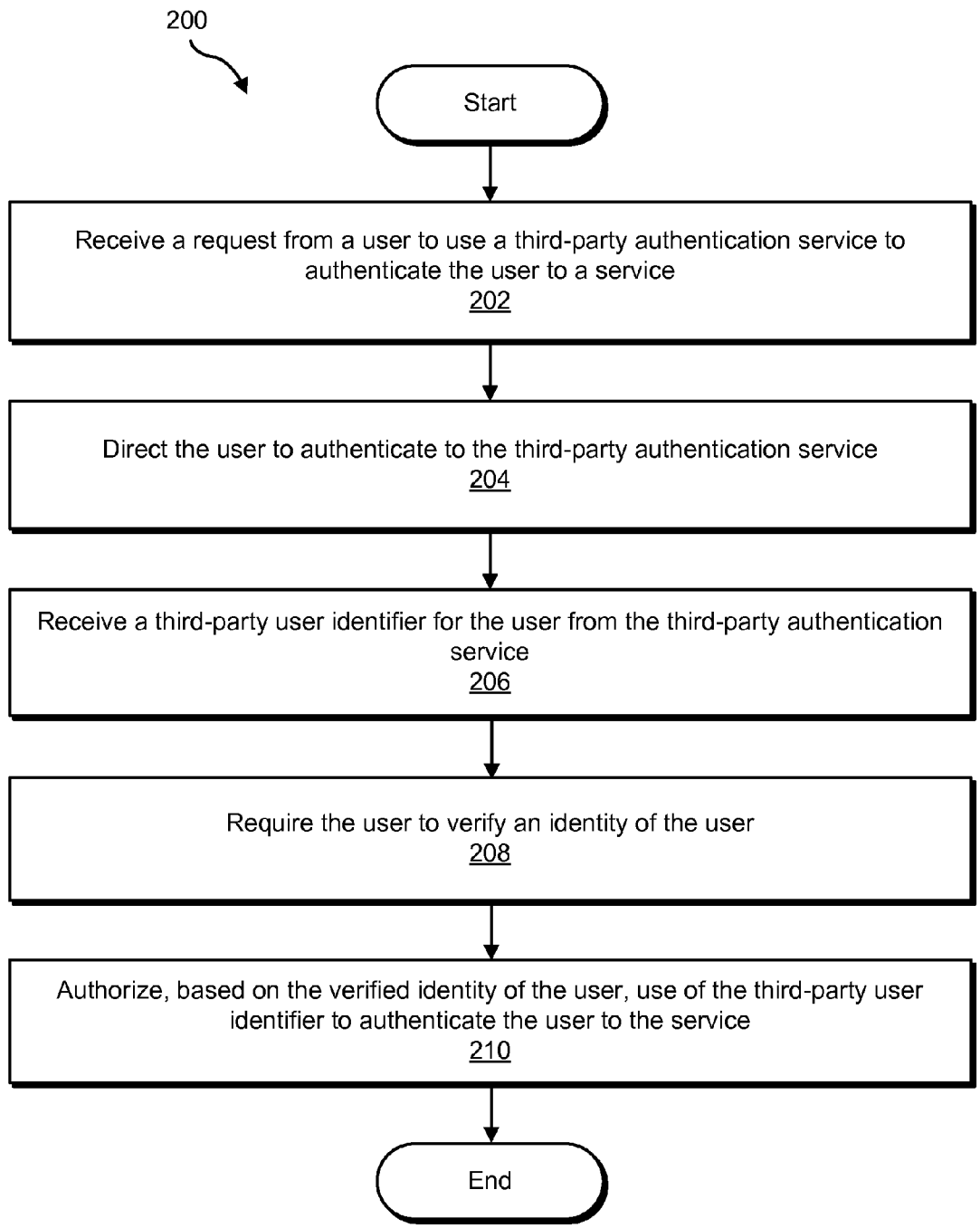
FIG. 2 illustrates an exemplary method of authorizing third-party authentication to a service according to principles described herein.

To illustrate, FIG. 2 illustrates an exemplary method 200 of authorizing third-party authentication to a service according to principles described herein. While FIG. 2 illustrates exemplary steps according to one embodiment, other embodiments may omit, add to, combine, reorder, and/or modify any of the steps shown in FIG. 2. In some examples, one or more steps shown in FIG. 2 may be performed by service provider subsystem 102.

In step 202, service provider subsystem 102 receives a request from a user to use a third-party authentication service to authenticate the user to a service provided by service provider subsystem 102. The request may be received in any suitable way. For example, service provider subsystem 102 may provide a user interface (e.g., a webpage) to user device subsystem 104 for use by the user to interact with service provider subsystem 102. The user interface may include an option configured to be selected by the user to indicate that the user wants to use a third-party authentication service to authenticate to the service provided by service provider subsystem 102. In response to a user selection of the option, user device subsystem 104 may send and service provider subsystem 102 may receive the request of the user to use a third-party authenticated service to authenticate the user to the service provided by service provider subsystem 102.

Figure 3:
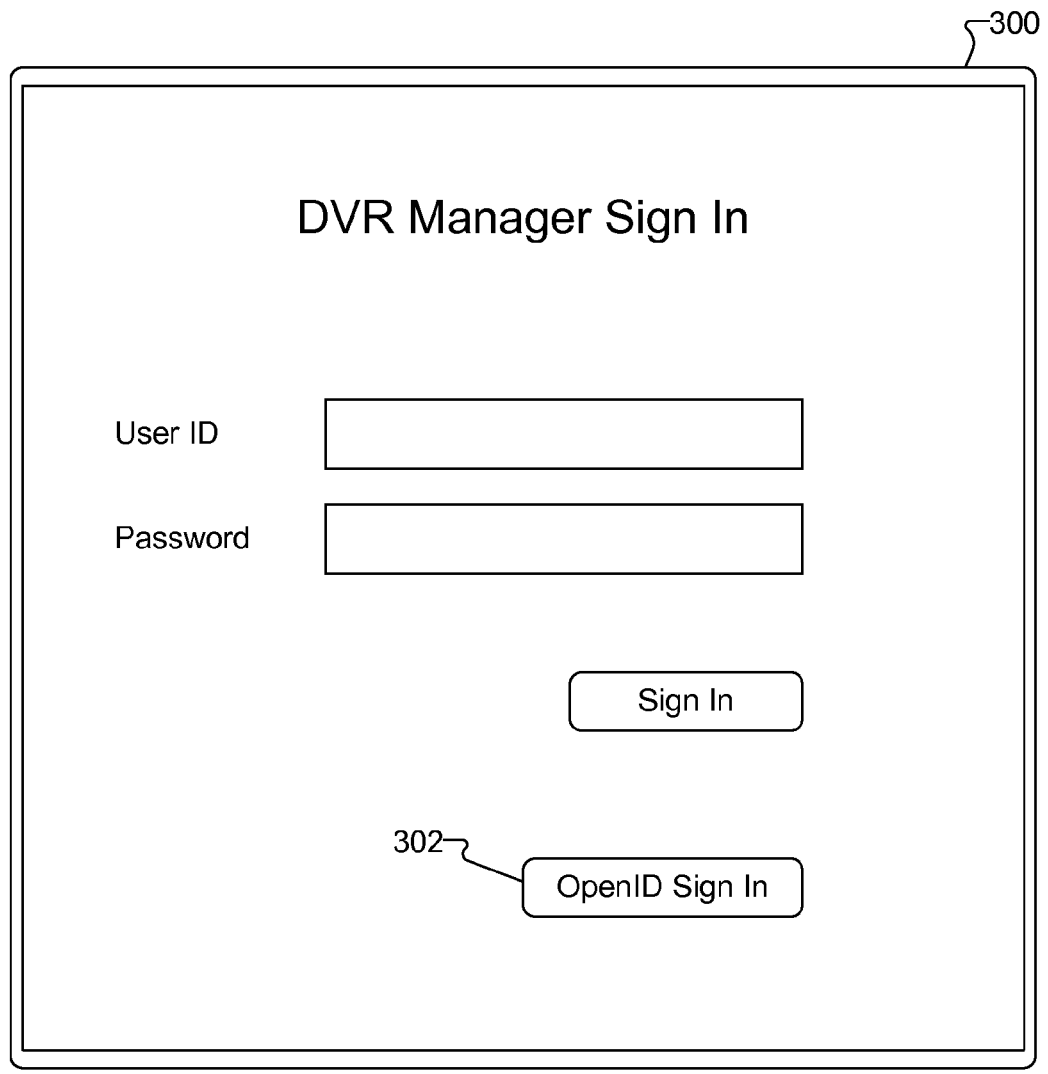
FIGS. 3-5 illustrate exemplary graphical user interfaces according to principles described herein.
Figure 4:
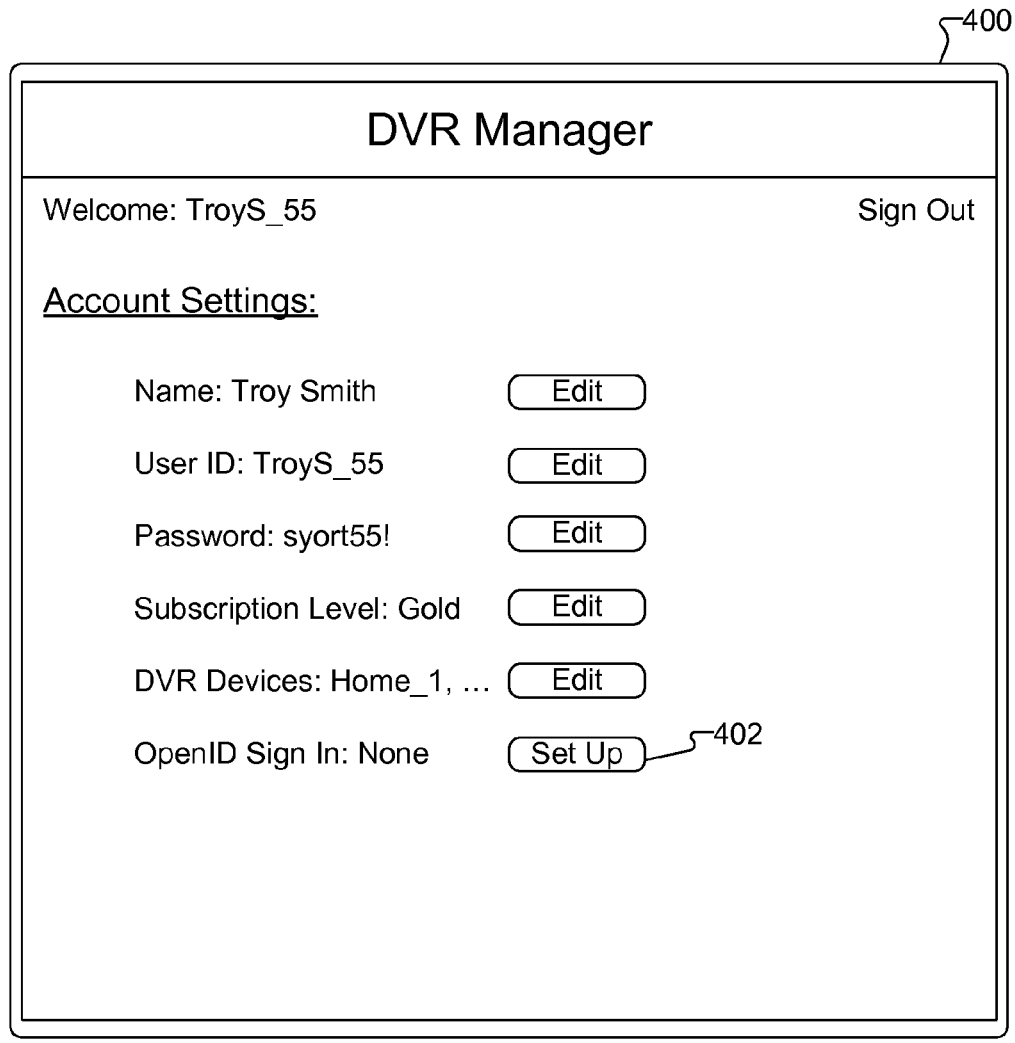

The user selectable option may be presented in the user interface before or after the user has logged in to and been authenticated by service provider subsystem 102. For example, FIG. 3 illustrates an exemplary graphical user interface ("GUI") 300 that may be provided by service provider subsystem 102 and displayed by user device subsystem 104 before the user has logged in to service provider subsystem 102. As shown, GUI 300 comprises a login page that prompts the user to enter user credentials in the form of a user identifier and password that are specific to service provider subsystem 102. GUI 300 further includes a user selectable option 302 that may be selected by the user to indicate that the user wants to use a third-party authentication service to authenticate to the service provided by service provider subsystem 102. As another example, FIG. 4 illustrates an exemplary GUI 400 that may be provided by service provider subsystem 102 and displayed by user device subsystem 104 after the user has logged in to and been authenticated by service provider subsystem 102. As shown, GUI 400 may include a user selectable option 402 that may be selected by the user to indicate that the user wants to set up use of a third-party authentication service to authenticate to the service provided by service provider subsystem 102.

Returning to FIG. 2, in step 204, service provider subsystem 102 directs the user to authenticate to the third-party authentication service. Step 204 may be performed in any suitable way. For example, service provider subsystem 102 may generate and send a message to user device subsystem 104 that directs user device subsystem 104 to generate and send a login request message to third-party subsystem 108. In certain examples, this may be performed by service provider subsystem 102 generating and sending a redirect uniform resource locator ("URL") to user device subsystem 104 that is configured to direct user device subsystem 104 to send a request for a login page to third-party subsystem 108. Additionally or alternatively, step 204 may include service provider subsystem 102 communicating with third-party subsystem 108 to notify third-party subsystem 108 of the request from the user and/or of service provider subsystem 102 directing the user to authenticate to the third-party service. Additionally or alternatively, step 204 may include third-party subsystem 108 communicating with service provider subsystem 102 to verify that a request for a login page from user device subsystem 104 is actually initiated by service provider subsystem 102.

Third-party subsystem 108 may receive the login request from user device subsystem 104 and respond by providing a login page to user device subsystem 104. User device subsystem 104 (e.g., a user device included in user device subsystem 104) may present the login page to the user, who may enter login credentials such as a user identifier and password specific to third-party subsystem 108 into the login page. In response, user device subsystem 104 may transmit data representative of the login credentials entered by the user to third-party subsystem 108. Third-party subsystem 108 may use the login credentials, which are specific to the user and to third-party subsystem 108, to authenticate the user to the third-party authentication service provided by third-party subsystem 108.

Figure 5:
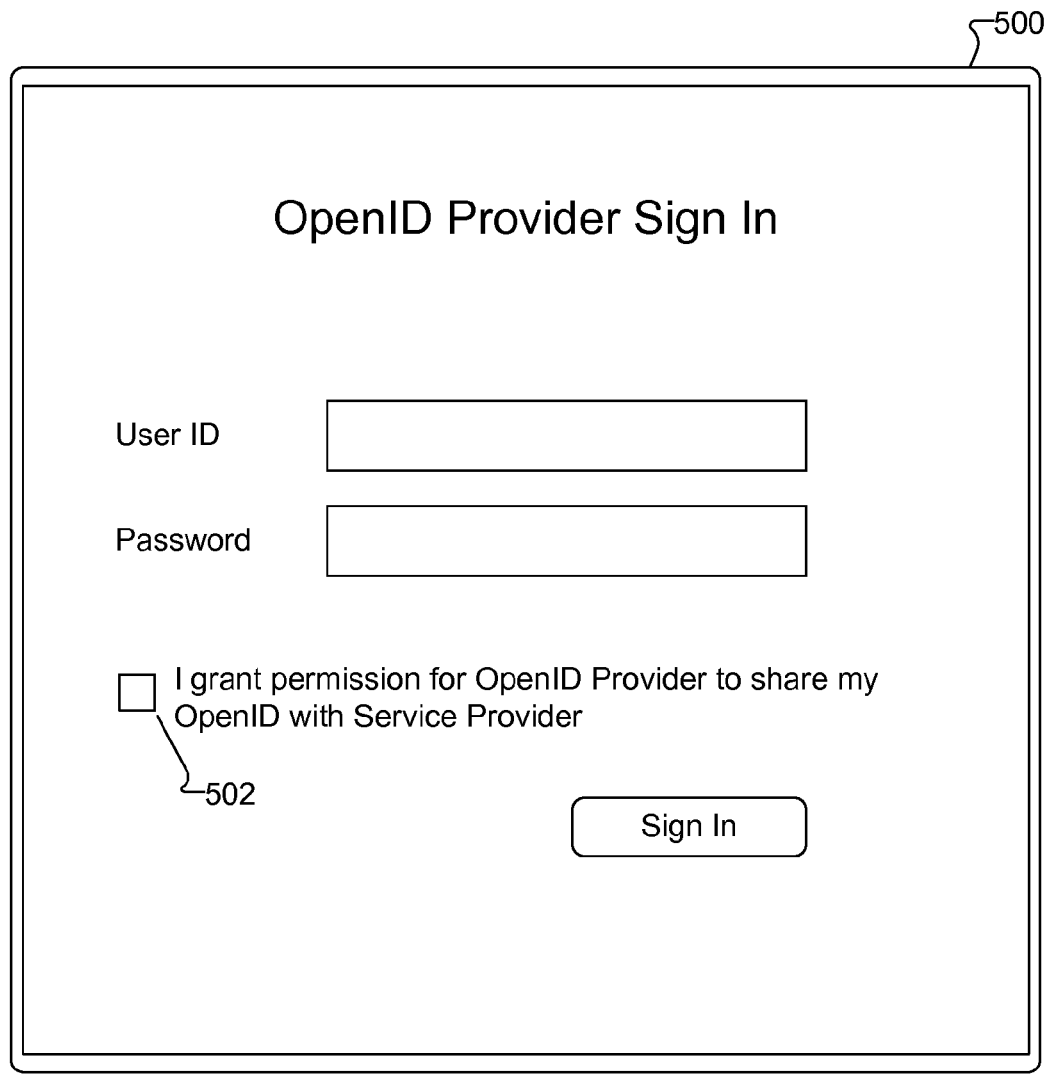

In certain examples, the login page provided by a third-party subsystem 108 and displayed by user device subsystem 104 may include an option configured to be selected by the user to grant third-party subsystem 108 permission to share information about the user (e.g., a unique user identifier associated with the user and maintained by third-party subsystem 108) with service provider subsystem 102. For example, FIG. 5 illustrates an exemplary GUI 500 that comprises a login page provided by third-party subsystem 108 for use by the user to log in to the third-party authentication service provided by third-party subsystem 108. As shown, GUI 500 may include a user selectable option 502 that may be selected by the user to grant the third party operating third-party subsystem 108 permission to share user information (e.g., an OpenID of a user) with service provider subsystem 102.

After third-party subsystem 108 has received and used the login credentials provided by the user through the login page to authenticate the user to the third-party authentication service provided by third-party subsystem 108, third-party subsystem 108 may identify, from the login credentials, a unique user identifier (e.g., an OpenID) maintained by third-party subsystem 108 for the user. Third-party subsystem 108 may send data representative of the unique user identifier to service provider subsystem 102.

Returning to FIG. 2, in step 206, service provider subsystem 102 receives the third-party user identifier for the user from third-party subsystem 108. Service provider subsystem 102 may determine that the third-party user identifier is associated with a request to authorize the third-party user identifier for use to authenticate the user to the service provided by service provider subsystem 102. In response to the receipt of the third-party user identifier and the determination that the third-party user identifier is associated with a request to authorize the third-party user identifier for use in authenticating the user to the service, service provider subsystem 102 may perform steps 208-210 of method 200.

In step 208, service provider subsystem 102 requires the user to verify an identity of the user. Service provider subsystem 102 may be configured to require any verification of the identity of the user that has been defined by the service provider operating service provider subsystem 102 to be acceptable to the service provider. In certain examples, verification of the identity of the user may include service provider subsystem 102 determining whether the user is currently authenticated and logged in to the service provided by service provider subsystem 102. If the user has logged in to the service using login credentials specific to service provider subsystem 102 and was logged in to the service when the user selected an option to request third-party authentication to the service, the user may remain logged in to the service when service provider subsystem 102 receives the third-party user identifier for the user from the third-party subsystem 108 in step 206. Service provider subsystem 102 may determine that the user is currently logged in and use this authentication of the user with service provider subsystem 102 by way of user login credentials that are specific to the service provider subsystem 102 to count as verification of the identity of the user with service provider subsystem 102.

In other examples, the user may not be currently authenticated and logged in to the service provided by service provider subsystem 102 when service provider subsystem 102 receives the third-party user identifier for the user from third-party subsystem 108. For example, the user may have selected an option to request third-party authentication to the service provided by service provider subsystem 102 without and/or before logging in to service provider subsystem 102, such as by selecting option 302 in GUI 300 shown in FIG. 3. In such cases, step 208 may include service provider subsystem 102 directing the user to provide login credentials specific to the user and service provider subsystem 102 in order to verify the identity of the user to service provider subsystem 102. Service provider subsystem 102 may receive and validate the login credentials to verify the identity of the user.

Figure 6:
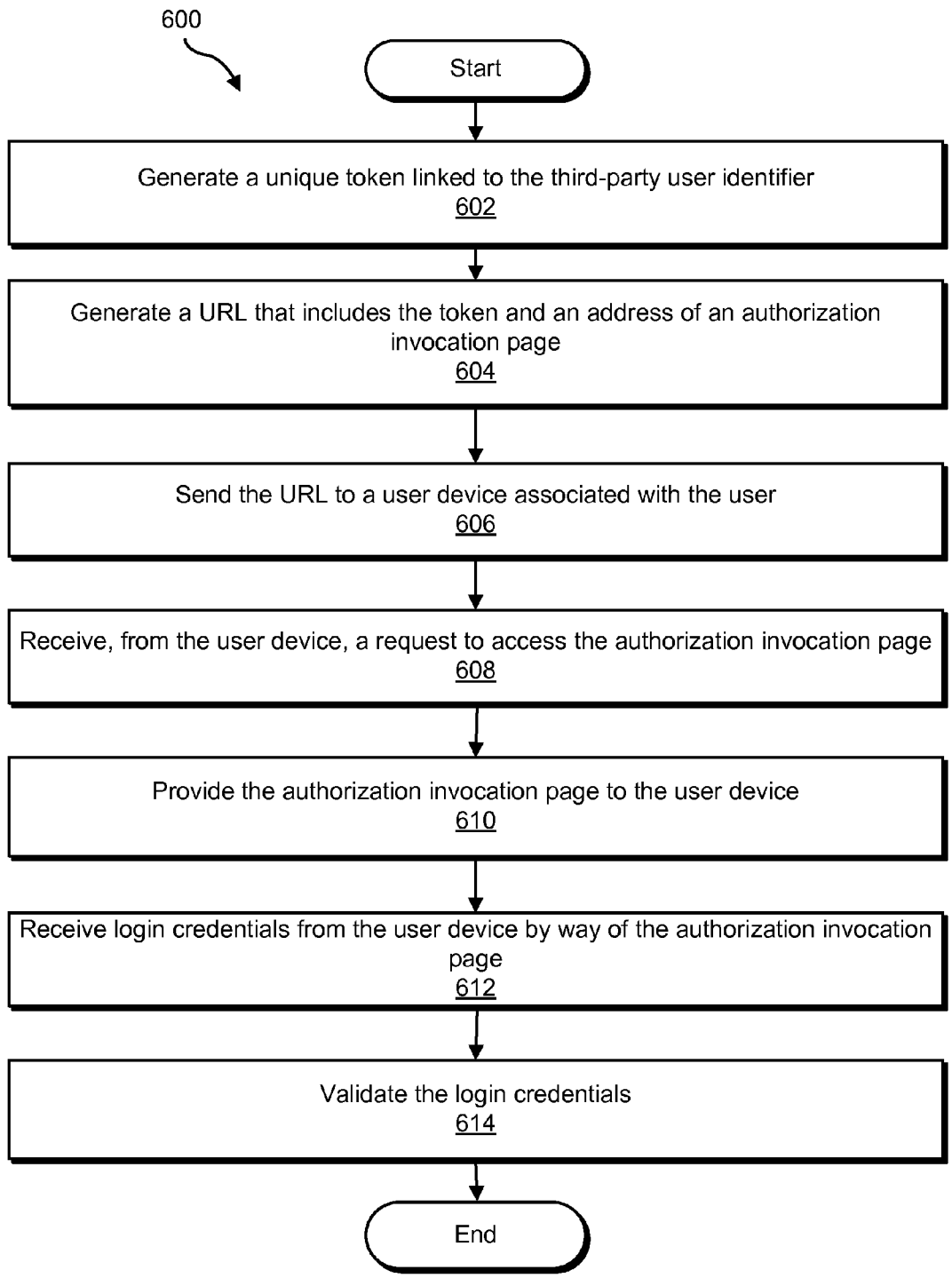
FIG. 6 illustrates an exemplary method of verifying an identity of a user according to principles described herein.

To illustrate, FIG. 6 shows an exemplary method 600 of verifying an identity of a user. While FIG. 6 illustrates exemplary steps according to one embodiment, other embodiments may omit, add to, combine, reorder, and/or modify any of the steps shown in FIG. 6. In some examples, one or more steps shown in FIG. 6 may be performed by service provider subsystem 102.

In step 602, service provider subsystem 102 generates a unique token linked to the third-party user identifier received in step 206 of method 200. Service provider subsystem 102 may be configured to generate a unique token in any suitable way and/or form. In certain embodiments, service provider subsystem 102 may generate the unique token based at least in part on the received third-party user identifier or a portion thereof. Service provider subsystem 102 maintains data representative of the unique token, the third-party user identifier, and a link between the unique token and the third-party user identifier.

In step 604, service provider subsystem 102 generates a URL that includes the token and an address at which an authorization invocation page provided by service provider subsystem 102 may be accessed. For example, the URL may specify the address at which the authorization invocation page may be accessed and may include the token appended to the address of the authorization invocation page. By including the token in the URL, service provider subsystem 102 may later be able to associate the token to any information sent or received in conjunction with the URL. For example, as described further below, service provider subsystem 102 may link the token included in the URL to user credentials received from a user by way of the authorization invocation page associated with the URL, which link may then be used to associate the correct third-party user identifier linked to the token with a service account that may be identified from the login credentials by service provider subsystem 102.

In step 606, service provider subsystem 102 sends the URL to a user device associated with the user, such as a user device included in user device subsystem 104. The URL may direct the user device to request access to the authorization invocation page. Accordingly, the user device may send a request to access the authorization invocation page to service provider subsystem 102.

In step 608, service provider subsystem 102 may receive, from the user device, the request to access the authorization invocation page. In response, service provider subsystem 102 may provide the authorization invocation page to the user device in step 610. The user device may access and present the authorization invocation page, which may prompt the user to provide login credentials that are specific to the user and service provider subsystem 102 in order to verify the identity of the user. For example, FIG. 7 illustrates an exemplary authorization invocation page in the form of a GUI 700 through which the user may enter login credentials to be used to authenticate the user to service provider subsystem 102. The user may provide user credentials by way of the authorization invocation page, and the user device may send data representative of the login credentials received from the user to service provider subsystem 102.

Returning to FIG. 6, in step 612, service provider subsystem 102 receives, from the user device by way of the authorization invocation page, login credentials specific to the user and the service provided by service provider subsystem 102. In step 614, service provider subsystem 102 validates the login credentials. The login credentials may be validated in any suitable way. For example, service provider subsystem 102 may search a database of login credentials maintained by service provider subsystem 102 for a match to the login credentials received from the user device. If a match is found, service provider subsystem 102 validates the login credentials as being associated with a registered user of the service provided by service provider subsystem 102.

While method 600 illustrates an example of obtaining and using user login credentials specific to service provider subsystem 102 to verify the identity of the user, this is illustrative only. Service provider subsystem 102 may be configured to accept additional or alternative user information to verify the identity of the user in other examples. For instance, service provider subsystem 102 may be configured to obtain and accept a credit card number that matches a credit card number associated with a service account of the user as valid verification of the identity of the user.

To illustrate an example of service provider subsystem 102 providing an additional level of security, in addition to providing an authorization invocation page such as GUI 700 to a user, service provider subsystem 102 may generate and send a code to a particular user device associated with the user, such as a mobile phone operated by the user. Service provider subsystem 102 may identify an address for the mobile phone (e.g., a telephone number for the mobile phone) from a service account associated with the user or by asking the user to provide the address for the mobile phone.

Figure 8:
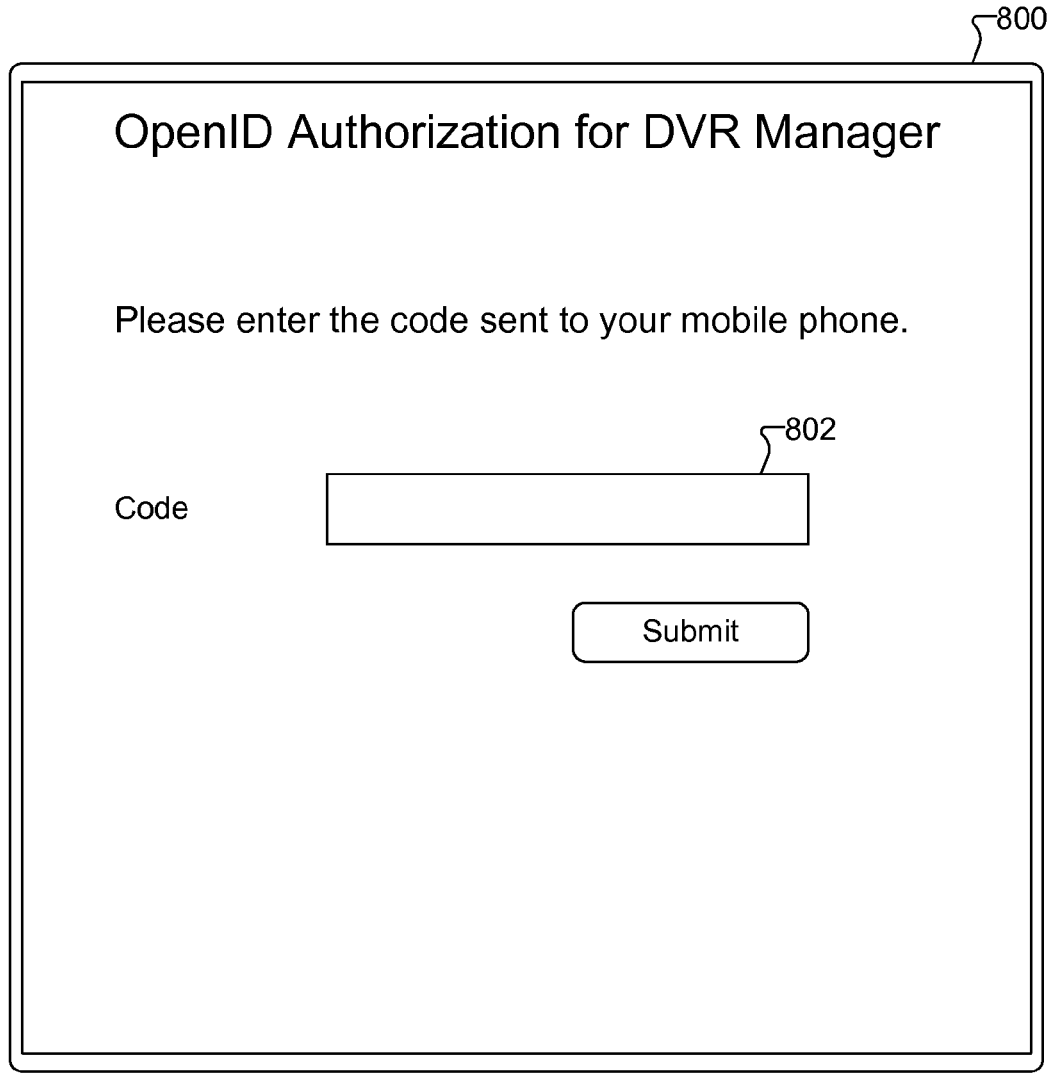

As an example, after performance of method 600 shown in FIG. 6, service provider subsystem 102 may use the login credentials received in step 612 to identify a service account for the user and a mobile phone number associated with the service account. Service provider subsystem 102 may generate and send a code (e.g., a twelve-digit numerical code) to the mobile phone of the user, such as by sending the code in a short message service ("SMS") message. Service provider subsystem 102 may then provide a code input page to another user device (e.g., a personal computer) included in user subsystem 104 for presentation to the user. The user may use the mobile phone to access the code and the other user device to enter the code into the code input page. The other user device may then send the code input by the user to service provided subsystem 102 for validation. FIG. 8 illustrates an exemplary code input page in the form of a GUI 800 that prompts the user to input the code into a code entry field 802.

By implementing security measures such as requiring the user to verify the identity of the user before authorizing third-party authentication to a service, service provider subsystem 102 may protect against certain potential security problems such as OpenID phishing schemes and/or fake or unrelated OpenIDs such as may be used by spammers.

Returning again to FIG. 2, in step 210, service provider subsystem 102 authorizes, based on the verified identity of the user, use of the third-party user identifier to authenticate the user to the service provided by service provider subsystem 102. Service provider subsystem 102 may be configured to perform this authorization in any way that makes the third-party user identifier usable to authenticate the user to the service provided by service provider subsystem 102.

Figure 9:
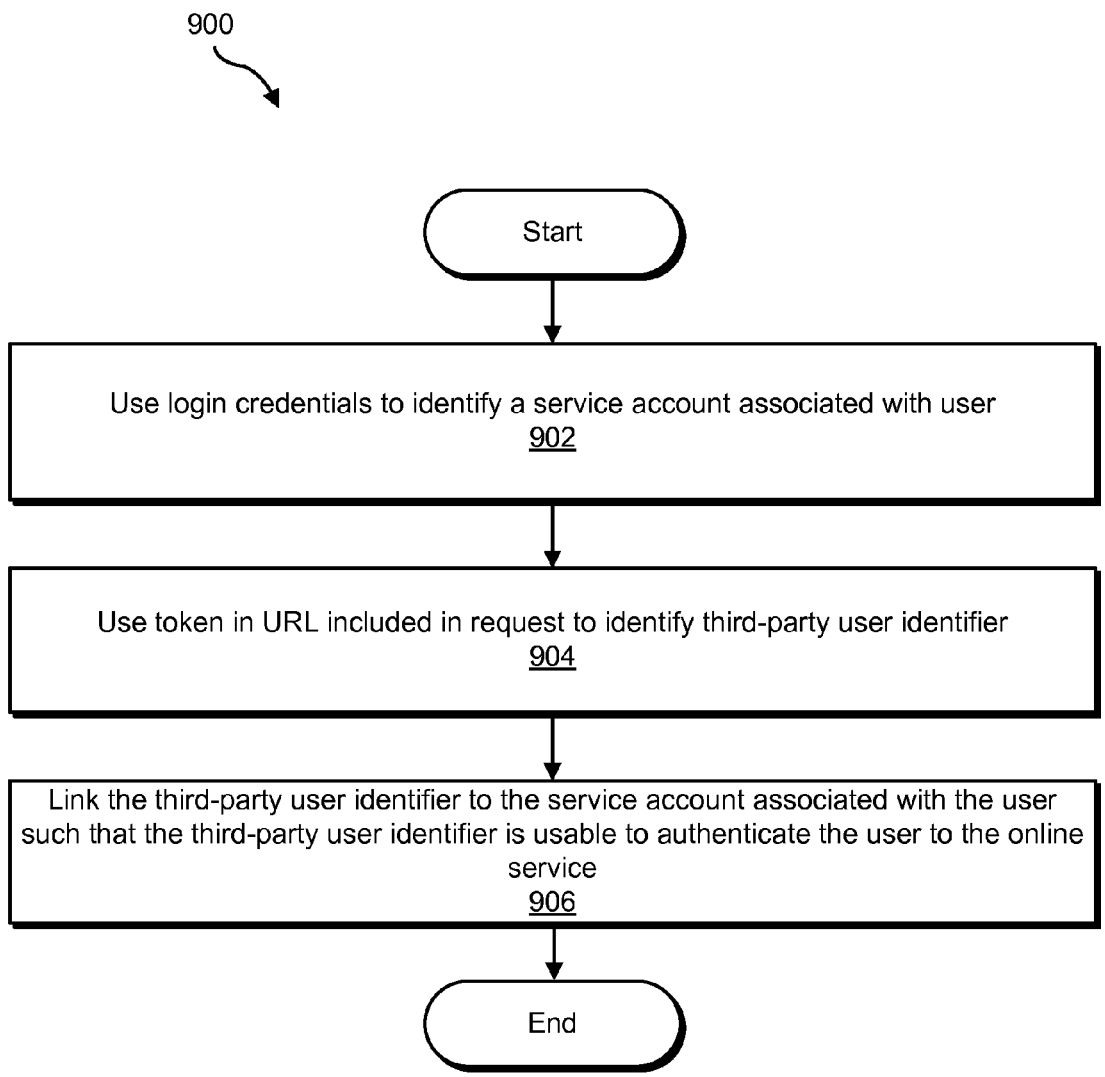
FIG. 9 illustrates an exemplary method of authorizing third-party authentication to a service according to principles described herein.

As an example, FIG. 9 shows an exemplary method 900 of authorizing use of a third-party user identifier for authentication to a service. While FIG. 9 illustrates exemplary steps according to one embodiment, other embodiments may omit, add to, combine, reorder, and/or modify any of the steps shown in FIG. 9. In some examples, one or more steps shown in FIG. 9 may be performed by service provider subsystem 102.

In step 902, service provider subsystem 102 uses the login credentials received in step 208 of method 200 to identify a service account associated with the user. For example, when service provider subsystem 102 locates a match for the user login credentials in a database of login credentials, service provider subsystem 102 may identify, from data maintained by service provider subsystem 102, a specific service account associated with the login credentials, which service account is specific to the user associated with the login credentials.

In step 904, service provider subsystem 102 uses the token included in the URL used in step 208 of method 200 (and thereby associated with the login credentials) to identify the third-party user identifier associated with the user (e.g., the same third-party user identifier received in step 206 of method 200). As mentioned, service provider subsystem 102 maintains data representative of the token, the third-party user identifier, and a link between the token and the third-party user identifier. Accordingly, service provider subsystem 102 may use the token, which may be received together with the request to access the authorization invocation page, received together with the login credentials, or otherwise be associated with the login credentials to identify a third-party user identifier that has been linked to the token by service provider subsystem 102, as described above.

In step 906, service provider subsystem 102 links the third-party user identifier to the service account associated with the user such that the third-party user identifier is usable to authenticate the user to the service provided by service provider subsystem 102. The linking may be performed in any suitable way. For example, service provider subsystem 102 may add data representative of the third-party user identifier to the service account.

Figure 10:
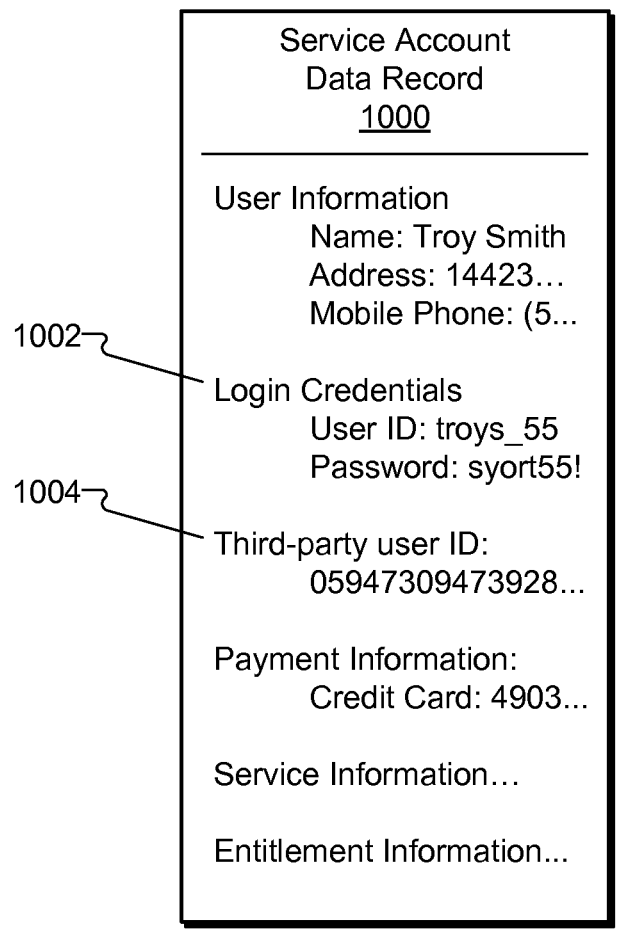
FIG. 10 illustrates an exemplary service account data record according to principles described herein.

FIG. 10 illustrates an exemplary service account data record 1000 that includes data associated with a service account and/or the user associated with the service account. As shown, data record 1000 may include user login credentials 1002 that are specific to the user and service provider subsystem 102 and that may be used to authenticate the user to service provider subsystem 102. In addition, service account data record 1000 may include data 1004 representative of a third-party user identifier that is provided by a third-party authentication service and that has been added to the data record 1000 to authorize the third-party user identifier to be used to authenticate the user to the service provided by service provider subsystem 102.

Figure 11:
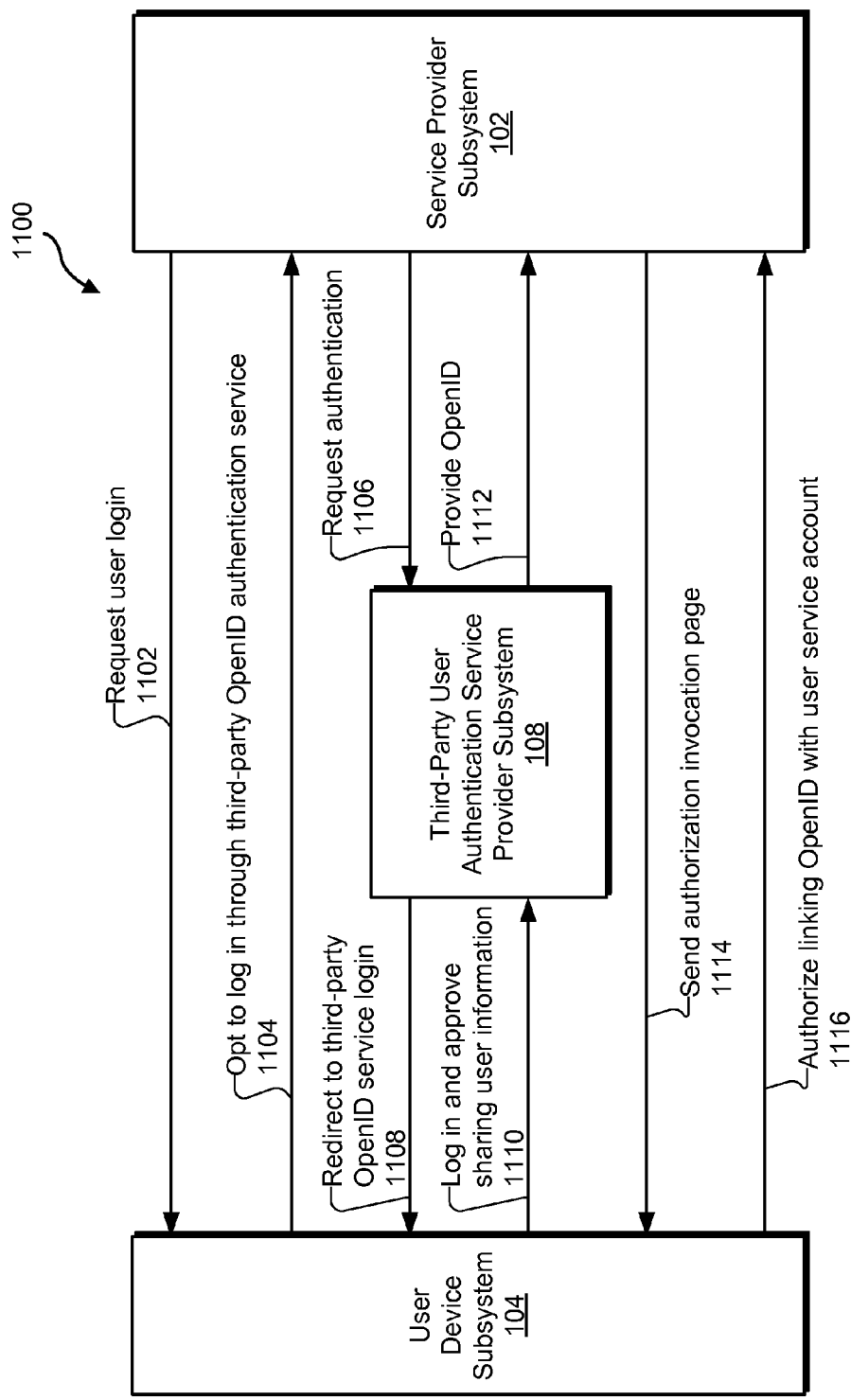
FIG. 11 illustrates an exemplary communications flow for authorizing third-party authentication to a service according to principles described herein.

FIG. 11 illustrates an exemplary communications flow 1100 for authorizing third-party authentication to a service according to principles described herein. While communications flow 1100 is described in the context of authorizing an OpenID provided by an OpenID provider for use in authenticating a user to a service provided by service provider subsystem 102, this is illustrative only. Communications flow 1100 may be representative of communications flows associated with authorization of other types of third-party authentications for use in authenticating a user to a service provided by service provider subsystem 102.

In step 1102, service provider subsystem 102 sends a user login request to user device subsystem 104 to request that a user of user device subsystem 104 log in to a service provided by service provider subsystem 102. For example, service provider subsystem 102 may send data representative of a service login page, such as GUI 300 shown in FIG. 3, to a user device included in user device subsystem 104.

In step 1104, a user of user device subsystem 104 opts to log in to the service through a third-party OpenID authentication service. In response, user device subsystem 104 sends a message to service provider subsystem 102 to indicate that the user wants to log in through the third-party OpenID authentication service.

In steps 1106 and 1108, service provider subsystem 102 directs the user to authenticate to the third-party OpenID authentication service, such as described herein. Service provider subsystem 102 may communicate with user device subsystem 104 and/or third-party subsystem 108 to directly or indirectly direct the user to authenticate to the third-party OpenID authentication service. In certain examples, service provider subsystem 102 may be configured to send a message to third-party subsystem 108 to request third-party authentication of the user. In response, third-party subsystem 108 may redirect user device subsystem 104 to a third-party service login page, such as GUI 500 shown in FIG. 5. For example, third-party subsystem 108 may send a redirect URL to a user device within user device subsystem 104 to redirect the user device to request access to the third-party service login page. In other examples, service provider subsystem 102 may be configured to send a redirect message (e.g., a redirect URL) to a user device within user device subsystem 104 to direct the user device to request access to the third-party service login page, such as described herein.

User device subsystem 104 may receive a redirect message and send a request for the third-party service login page to third-party subsystem 108, which may provide the third-party service login page to user device subsystem 104. The user of user device subsystem 104 may provide login credentials, and user device subsystem 104 may transmit the login credentials to third-party subsystem 108 in step 1110.

Third-party subsystem 108 may receive and validate the login credentials to authenticate the user to the third-party OpenID authentication service provided by third-party subsystem 108. Third-party subsystem 108 may then identify and send an OpenID for the user to service provider subsystem 102 in step 1112.

With respect to steps 1106-1112, in certain embodiments, service provider subsystem 102 and third-party subsystem 108 may be configured to communicate with one another and/or with user device subsystem 104 in accordance with a defined OpenID standard and/or protocol.

Service provider subsystem 102 may receive the OpenID for the user from third-party subsystem 108 in step 1112 and respond by requiring the user to verify the identity of the user. For example, service provider subsystem 102 may send an authorization invocation page, such as GUI 700 shown in FIG. 7, to user device subsystem 104 in step 1114. The authorization invocation page may be sent in any suitable way, such as by service provider subsystem 102 sending a redirect URL to a user device within user device subsystem 104, and the user device using the redirect URL to send a request for the authorization invocation page to service provider subsystem 102, which may then send the authorization invocation page to the user device.

The user of user device subsystem 104 may provide user login credentials specific to service provider subsystem 102 (and/or other user information defined to be acceptable to service provider subsystem 102 to verify the identity of the user) through the authorization invocation page, and user device subsystem 104 may send the user login credentials to service provider subsystem 102 in step 1116 for use by service provider subsystem 102 to verify the identity of the user and authorize use of the user's OpenID for authentication to a service provided by service provider subsystem 102. Service provider subsystem 102 may receive and validate the user login credentials, and authorize the OpenID for use in authenticating the user to the service by linking the OpenID to the user's service account maintained by service provider subsystem 102, such as described herein.

In certain embodiments, when service provider subsystem 102 receives a request from a user to log in to a service using a third-party identifier, service provider subsystem 102 may determine whether the user's third-party identifier has already been authorized for use in authenticating the user to the service. If the third-party identifier has not already been authorized, service provider subsystem 102 may further determine whether the user making the request is an existing user registered with service provider subsystem 102 or a new user seeking to register with service provider subsystem 102. Service provider subsystem 102 may perform one or more authentication and/or authorization operations depending on these determinations.

Figure 12:
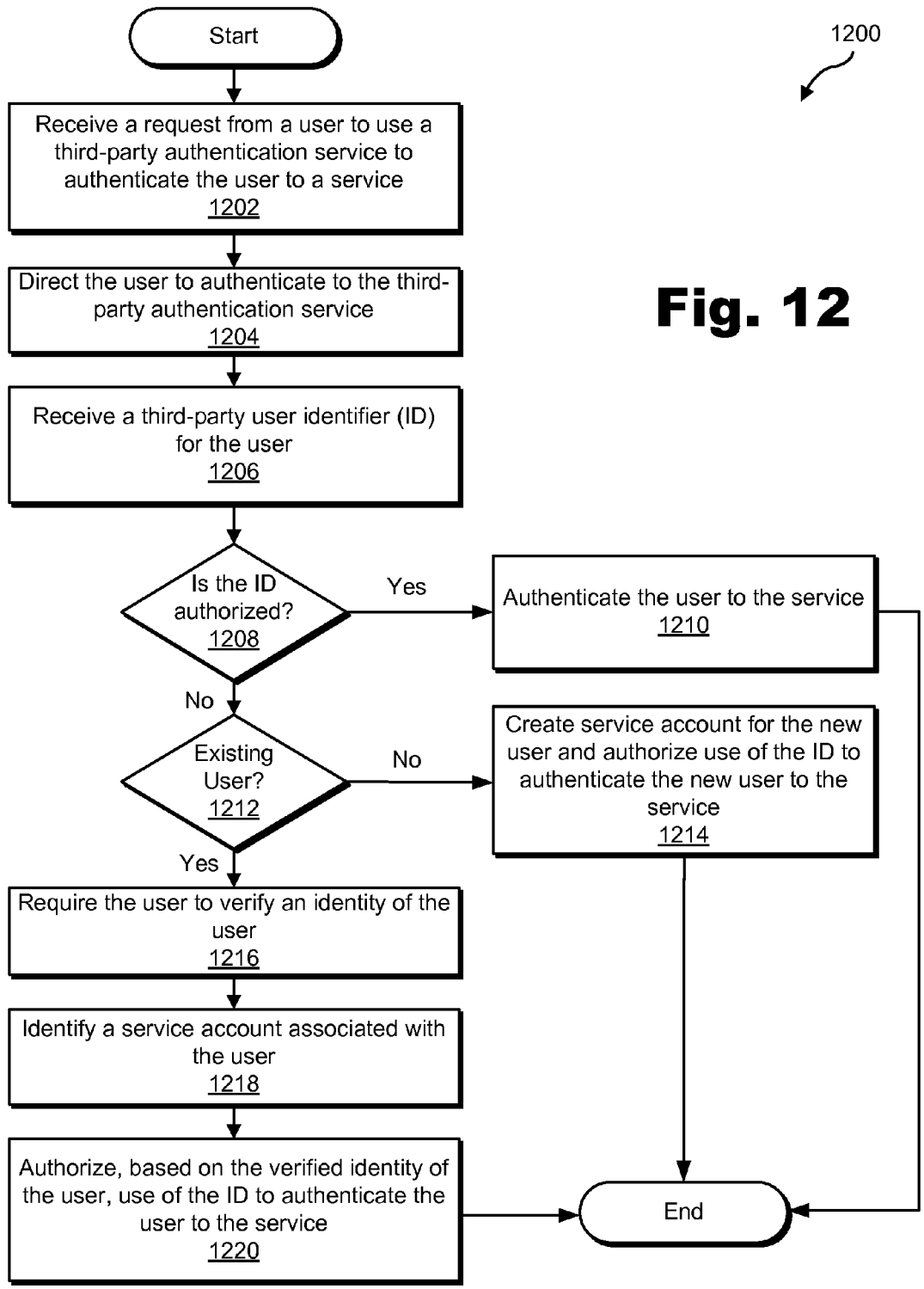
FIG. 12 illustrates an exemplary method of processing a user request to log in using a third-party user identifier according to principles described herein.

To illustrate, FIG. 12 shows an exemplary method 1200 of processing a user request to log in using a third-party user identifier according to principles described herein. While FIG. 12 illustrates exemplary steps according to one embodiment, other embodiments may omit, add to, combine, reorder, and/or modify any of the steps shown in FIG. 12. In some examples, one or more steps shown in FIG. 12 may be performed by service provider subsystem 102.

In step 1202, service provider subsystem 102 receives a request from a user to use a third-party authentication service to authenticate the user to a service provided by service provider subsystem 102, such as described herein.

In step 1204, service provider subsystem 102 directs the user to authenticate to the third-party authentication service, such as described herein.

In step 1206, service provider subsystem 102 receives the third-party user identifier for the user from third-party subsystem 108 that provides the third-party authentication service, such as described herein.

In step 1208, service provider subsystem 102 determines whether the third-party user identifier is already authorized for use to authenticate the user to the service. For example, service provider subsystem 102 may search a database of service accounts for a matching third-party user identifier. If a match is found, service provider subsystem 102 determines that the third-party user identifier is already authorized for use in authenticating the user to the service and authenticates the user to the service in step 1210. Method 1200 then ends after authentication of the user in step 1210, and service provider subsystem 102 grants the user access to the service.

Returning to step 1210, if a match to the third-party user identifier is not found, service provider subsystem 102 determines that the third-party user identifier is not yet authorized for use in authenticating the user to the service. Following this determination, service provider subsystem 102 determines whether the user making the request is an existing user in step

1212. For example, service provider subsystem 102 may prompt the user to provide input indicating whether the user is an existing or new user. Additionally or alternatively, service provider subsystem 102 may prompt the user to provide a mobile phone number that may be used by service provider subsystem 102 to determine whether the user has a mobile phone service account.

If service provider subsystem 102 determines that the user is not an existing user, processing may proceed to step 1214 in which service provider subsystem 102 creates a new service account for the new user and authorizes use of the third-party identifier to authenticate the new user to the service. For example, service provider subsystem 102 may link the third-party user identifier to the new service account. Method 1200 then ends after step 1214, with the new user having been registered with service provider subsystem 102 and the third-party user identifier for the user authorized for use in authenticating the user to the service. In certain embodiments, in conjunction with the registration of the new user, service provider subsystem 102 may allow the new user to elect whether to create user login credentials specific to service provider subsystem 102.

Returning to step 1212, if the user is determined to be an existing user, processing may proceed to step 1216 in which service provider subsystem 102 requires the user to verify the identity of the user in any of the ways described herein, such as by directing the user to provide user login credentials specific to service provider subsystem 102 and/or other acceptable user information that may be used to verify the identity of the user.

In step 1218, service provider subsystem 102 identifies an existing service account associated with the user, such as described herein.

In step 1220, service provider subsystem 102 authorizes, based on the verified identity of the user, use of the third-party user identifier to authenticate the user to the service, such as described herein. For example, service provider subsystem 102 may link the third-party user identifier to the service account identified in step 1218. Method 1200 then ends after step 1220, with the third-party user identifier for the user authorized for use in authenticating the user to the service.

Figure 13:
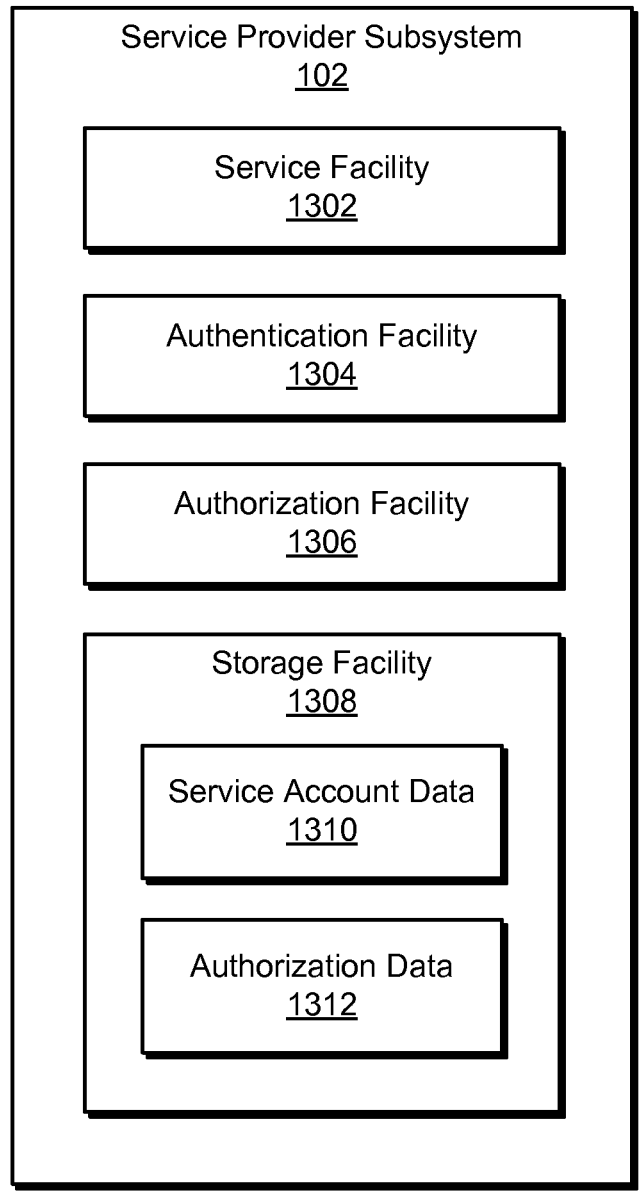
FIG. 13 illustrates exemplary components of a service provider subsystem according to principles described herein.

FIG. 13 illustrates exemplary components of service provider subsystem 102. As shown, service provider subsystem 102 may include, without limitation, a service facility 1302, an authentication facility 1304, an authorization facility 1306, and a storage facility 1308, which may be in communication with one another using any suitable communication technologies. It will be recognized that although facilities 1302-1308 are shown to be separate facilities in FIG. 13, any of facilities 1302-1308 may be combined into fewer facilities, such as into a single facility, or divided into more facilities as may serve a particular implementation.

Service facility 1302 may be configured to perform one or more operations to provide a service over network 106 for access by user device subsystem 104.

Authentication facility 1304 may be configured to perform one or more operations to authenticate a user to service provider subsystem 102. The authentication may be performed in any of the ways described herein, including by validating user login credentials specific to service provider subsystem 102 or by using a third-party user identifier that has been authorized for use in authentication to authenticate the user to service provider subsystem 102. After authentication facility 1304 authenticates a user, authentication facility 1304 may notify service facility 1302 such that service facility 1302 may provide a service to the user.

Authorization facility 1306 may be configured to perform one or more operations to authorize third-party authentication to a service, such as by authorizing a third-party user identifier received from third-party authentication service provider subsystem 108 for use to authenticate the user to a service provided by service facility 102. Authorization facility 1306 may perform the authorization in any of the ways described herein.

Storage facility 1308 may store data generated, maintained, and/or used by facilities 1302-1306. For example, storage facility 1308 may store service account data 1310 (e.g., one or more data records) representative of one or more service accounts for one or more users of a service provided by service facility 1302. Storage facility 1308 may also store authorization data 1312 representative of data used in relation to authorizing third-party authentication to a service. The authorization data 1312 may include data representative of tokens and/or codes generated by authorization facility 1306, third-party user identifiers received from third-party subsystem 108, and relationships between tokens and third-party identifiers. Storage facility 1308 may store additional or alternative data as may suit a particular implementation.

In certain embodiments, one or more of the components and/or processes described herein may be implemented and/or performed by one or more appropriately configured computing devices. To this end, one or more of the systems and/or components described above may include or be implemented by any computer hardware and/or computer-implemented instructions (e.g., software) embodied on at least one non-transitory computer-readable medium configured to perform one or more of the processes described herein. In particular, system components may be implemented on one physical computing device or may be implemented on more than one physical computing device. Accordingly, system components may include any number of computing devices, and may employ any of a number of computer operating systems.

In certain embodiments, one or more of the processes described herein may be implemented at least in part as instructions executable by one or more computing devices. In general, a processor (e.g., a microprocessor) receives instructions, from a tangible computer-readable medium, (e.g., a memory, etc.), and executes those instructions, thereby performing one or more processes, including one or more of the processes described herein. Such instructions may be stored and/or transmitted using any of a variety of known non-transitory computer-readable media.

A non-transitory computer-readable medium (also referred to as a processor-readable medium) includes any non-transitory medium that participates in providing data (e.g., instructions) that may be read by a computer (e.g., by a processor of a computer). Such a non-transitory medium may take many forms, including, but not limited to, non-volatile media and/or volatile media. Non-volatile media may include, for example, optical or magnetic disks and other persistent memory. Volatile media may include, for example, dynamic random access memory ("DRAM"), which typically constitutes a main memory. Common forms of non-transitory computer-readable media include, for example, a floppy disk, flexible disk, hard disk, magnetic tape, any other magnetic medium, a CD-ROM, DVD, any other optical medium, a RAM, a PROM, an EPROM, a FLASH-EEPROM, any other memory chip or cartridge, or any other non-transitory medium from which a computer can read.

Figure 14:
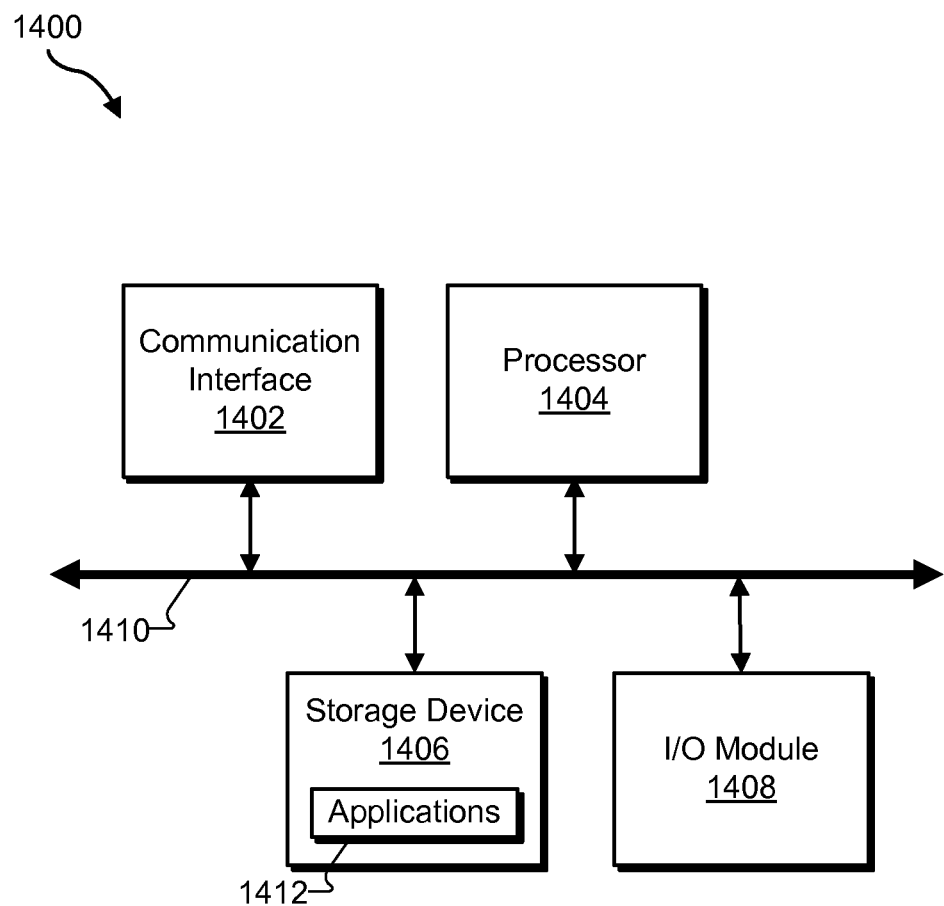
FIG. 14 illustrates an exemplary computing device according to principles described herein.

FIG. 14 illustrates an exemplary computing device 1400 that may be configured to perform one or more of the processes described herein. As shown in FIG. 14, computing device 1400 may include a communication interface 1402, a processor 1404, a storage device 1406, and an input/output ("I/O") module 1408 communicatively connected via a communication infrastructure 1410. While an exemplary computing device 1400 is shown in FIG. 14, the components illustrated in FIG. 14 are not intended to be limiting. Additional or alternative components may be used in other embodiments. Components of computing device 1400 shown in FIG. 14 will now be described in additional detail.

Communication interface 1402 may be configured to communicate with one or more computing devices. Examples of communication interface 1402 include, without limitation, a wired network interface (such as a network interface card), a wireless network interface (such as a wireless network interface card), a modem, and any other suitable interface. Communication interface 1402 may additionally or alternatively provide such a connection through, for example, a local area network (such as an Ethernet network), a personal area network, a telephone or cable network, a satellite data connection, an Internet access network, an Internet backbone network, or any other suitable connection. Communication interface 1402 may be configured to interface with any suitable communication media, protocols, and formats.

Processor 1404 generally represents any type or form of processing unit capable of processing data or interpreting, executing, and/or directing execution of one or more of the instructions, processes, and/or operations described herein. Processor 1404 may direct execution of operations in accordance with one or more applications 1412 or other computer-executable instructions such as may be stored in storage device 1406 or another non-transitory computer-readable medium.

Storage device 1406 may include one or more data storage media, devices, or configurations and may employ any type, form, and combination of data storage media and/or device. For example, storage device 1406 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 1406. For example, data representative of one or more executable applications 1412 (which may include, but are not limited to, one or more of the software applications described herein) configured to direct processor 1404 to perform any of the operations described herein may be stored within storage device 1406. In some examples, data may be arranged in one or more databases residing within storage device 1406.

I/O module 1408 may be configured to receive user input and provide user output and may include any hardware, firmware, software, or combination thereof supportive of input and output capabilities. For example, I/O module 1408 may include hardware and/or software for capturing user input, including, but not limited to, a keyboard or keypad, a touch screen component (e.g., touch screen display), a receiver (e.g., an RF or infrared receiver), and/or one or more input buttons.

I/O module 1408 may include one or more devices for presenting output to a user, including, but not limited to, a graphics engine, a display (e.g., a display screen, one or more output drivers (e.g., display drivers), one or more audio speakers, and one or more audio drivers. In certain embodiments, I/O module 1408 is configured to provide graphical data to a display for presentation to a user. The graphical data may be representative of one or more graphical user interfaces and/or any other graphical content as may serve a particular implementation.

In some examples, any subsystem and/or any of the facilities described herein may be implemented by or within one or more components of computing device 1400. For example, one or more applications 1412 residing within storage device 1406 may be configured to direct processor 1404 to perform one or more processes or functions associated with any subsystem and/or any of the facilities described herein. Storage facility 1308 may be implemented by or within storage device 1406.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
    receiving a request from a user to use a third-party authentication service to authenticate the user to a service provided by an online service provider subsystem;
    in response to the receiving of the request, directing the user to authenticate to the third-party authentication service;
    responsive to the directing, receiving a third-party user identifier for the user from the third-party authentication service; and
    responsive to the receiving of the third-party user identifier, requiring the user to verify an identity of the user, the requiring comprising:
        generating a unique token based at least in part on the received third-party user identifier, wherein the online service provider subsystem maintains data representative of the unique token, the third-party user identifier, and a link between the unique token and the third-party user identifier;
        generating a Uniform Resource Locator ("URL") that includes the unique token and an address of an authorization invocation page used to verify the identity of the user;
        sending the URL to a user device associated with the user;
        receiving, from the user device, a request to access the authorization invocation page, the request including the URL;
        providing the authorization invocation page to the user device;
        receiving, from the user device by way of the authorization invocation page, login credentials specific to the user and the service; and
        validating the login credentials; and
    responsive to the requiring, authorizing, based on the verified identity of the user, use of the third-party user identifier to authenticate the user to the service;
    wherein the online service provider subsystem performs the receiving of the request, the directing of the user to authenticate, the receiving of the third-party user identifier, the requiring of the user to verify the identity of the user, and the authorizing of the use of the third-party user identifier.

2. The method of claim 1, wherein the login credentials comprise a user identifier and password specific to the user and the service.

3. The method of claim 1, wherein the authorizing comprises:
using the login credentials to identify a service account associated with the user; and
linking the third-party user identifier to the service account associated with the user such that the third-party user identifier is usable to authenticate the user to the service.

4. The method of claim 1, wherein the sending of the URL to the user device associated with the user comprises sending the URL in a short message service ("SMS") message to a mobile phone device associated with the user.

5. The method of claim 1, wherein the authorizing comprises:
using the login credentials to identify a service account associated with the user;
using the unique token in the URL included in the request to access the authorization invocation page to identify the third-party user identifier; and
linking the third-party user identifier to the service account associated with the user such that the third-party user identifier is usable to authenticate the user to the service.

6. The method of claim 1, wherein the requiring further comprises:
generating and sending a code to a mobile phone device associated with the user;
directing the user to use another user device associated with the user to provide the code to the online service provider subsystem; and
receiving and validating the code.

7. The method of claim 1, wherein the requiring further comprises:
directing the user to provide a credit card number associated with the user; and
receiving and validating the credit card number.

8. The method of claim 1, further comprising, after the authorizing use of the third-party user identifier to authenticate the user to the service:
receiving an additional request from the user to use the third-party authentication service to authenticate the user to the service;
determining that the third-party user identifier is authorized for use in authenticating the user to the service; and
authenticating the user to the service based on the third-party user identifier,
wherein the online service provider subsystem performs the receiving of the additional request, the determining that the third-party user identifier is authorized, and the authenticating of the user to the service.

9. The method of claim 1, wherein the third-party user identifier for the user comprises an OpenID provided by the third-party authentication service.

10. The method of claim 1, wherein the service comprises a remote digital video recorder ("DVR") manager.

11. The method of claim 1, embodied as computer-executable instructions on at least one non-transitory computer-readable medium.

12. A method comprising:
receiving a request from a user to use a third-party authentication service to authenticate the user to an online service provided by an online service provider subsystem;
in response to the receiving of the request, directing the user to authenticate to the third-party authentication service;
responsive to the directing, receiving a third-party user identifier for the user from the third-party authentication service;
responsive to the receiving of the third-party user identifier, generating a unique token based at least in part on the received third-party user identifier, wherein the online service provider subsystem maintains data representative of the unique token, the third-party user identifier, and a link between the unique token and the third-party user identifier;
responsive to the generating of the unique token, generating a Uniform Resource Locator ("URL") that includes the unique token and an address of an authorization invocation page;
sending the URL to a user device associated with the user;
receiving, from the user device, a request to access the authorization invocation page, the request including the URL;
providing the authorization invocation page to the user device;
receiving, from the user device by way of the authorization invocation page, login credentials specific to the user and the online service;
validating the login credentials;
using the validated login credentials to identify a service account associated with the user;
using the unique token in the URL included in the request to access the authorization invocation page to identify the third-party user identifier; and
linking the third-party user identifier to the service account associated with the user such that the third-party user identifier is usable to authenticate the user to the online service;
wherein the online service provider subsystem performs the receiving of the request, the directing of the user to authenticate, the receiving of the third-party user identifier, the generating of the unique token, the generating of the URL, the sending of the URL, the receiving of the request to access the authorization invocation page, the providing of the authorization invocation page, the receiving of the login credentials, the validating, the using of the login credentials, the using of the unique token, and the linking of the third-party user identifier.

13. The method of claim 12, further comprising:
identifying, from the service account, a mobile phone number associated with the user;
generating and sending a code to the mobile phone number associated with the user;
directing the user to use another user device associated with the user to provide the code to the online service provider subsystem; and
receiving and validating the code;
wherein the linking is performed in response to the validating of the code and the online service provider subsystem performs the identifying, the generating and sending, the directing of the user to use the another user device, and the receiving and validating.

14. The method of claim 12, embodied as computer-executable instructions on at least one non-transitory computer-readable medium.

15. A system comprising:
an authentication facility configured to:
receive a request from a user to use a third-party authentication service to authenticate the user to an online service and responsive to the receiving of the request, direct the user to authenticate to the third-party authentication service, and responsive to the directing, receive, from the third-party authentication service, a third-party user identifier for the user; and an authorization facility communicatively coupled to the authentication facility and configured to:
require the user to verify an identity of the user by:
generating a unique token based at least in part on the received third-party user identifier,
maintaining data representative of the unique token, the third-party user identifier, and a link between the unique token and the third-party user identifier,
generating a Uniform Resource Locator ("URL") that includes the unique token and an address of an authorization invocation page used to verify the identity of the user,
sending the URL to a user device associated with the user;
receiving, from the user device, a request to access the authorization invocation page, the request including the URL;
providing the authorization invocation page to the user device;
receiving, from the user device by way of the authorization invocation page, login credentials specific to the user and the online service; and
validating the login credentials; and
authorize, based on the verified identity of the user, use of the third-party user identifier to authenticate the user to the online service.

16. The system of claim 15, wherein the authorization facility is configured to authorize use of the third-party user identifier to authenticate the user to the online service by:
using the login credentials to identify a service account associated with the user; and
linking the third-party user identifier to the service account associated with the user such that the third-party user identifier is usable to authenticate the user to the online service.

17. The system of claim 15, wherein the authorization facility is further configured to require the user to verify an identity of the user by:
generating and sending a code to a mobile phone device associated with the user;
directing the user to use another user device associated with the user to provide the code to the online service provider subsystem; and
receiving and validating the code.

18. The system of claim 15, wherein the authentication facility is further configured to:
receive, after the authorization of the third-party user identifier for use to authenticate the user to the online service, an additional request from the user to use the third-party authentication service to authenticate the user to the online service;
determine that the third-party user identifier is authorized to authenticate the user to the online service; and
authenticate the user to the online service based on the third-party user identifier.

* * * * *